Jan. 11, 1938. R. C. STEVENS 2,104,936
FOCUSING DEVICE FOR MOTION PICTURE CAMERAS
Filed July 23, 1935 4 Sheets-Sheet 1

INVENTOR.
ROBERT C. STEVENS
BY
ATTORNEY.

Jan. 11, 1938.  R. C. STEVENS  2,104,936
FOCUSING DEVICE FOR MOTION PICTURE CAMERAS
Filed July 23, 1935  4 Sheets-Sheet 2

INVENTOR.
ROBERT C. STEVENS
BY
ATTORNEY.

Jan. 11, 1938.  R. C. STEVENS  2,104,936
FOCUSING DEVICE FOR MOTION PICTURE CAMERAS
Filed July 23, 1935  4 Sheets-Sheet 4

INVENTOR.
ROBERT C. STEVENS.
BY
ATTORNEY.

Patented Jan. 11, 1938

2,104,936

UNITED STATES PATENT OFFICE 2,104,936

FOCUSING DEVICE FOR MOTION PICTURE CAMERAS

Robert Colby Stevens, Beverly Hills, Calif., assignor to Fox Film Corporation, Los Angeles Calif., a corporation of New York Application July 23, 1935, Serial No. 32,714

26 Claims. (Cl. 88—16)

This invention relates to cinematography and deals with a means for focusing motion picture cameras.

The principal object of this invention is to provide a simple, durable and convenient means for focusing motion picture cameras that is characterized by absolute precision.

In focusing motion picture cameras, it is common practice to view the object to be photographed directly through the photographing lens and to bring the lens into focus while viewing. In order to do this, however, it is necessary to move the intermittent mechanism, with the film, to one side and bring an eye piece into registration with the photographing lens or the film may be moved back and a prism inserted for an offset viewing.

In the camera to be hereinafter described, focusing is accomplished by rotating the camera case so that the photographing aperture is replaced by a focusing aperture.

The preferred form of my invention embodies a yoke adapted to be mounted on a camera support of any suitable type such as a tripod, camera carriage or the like and a camera case rotatably mounted in the yoke in a manner that the axis of rotation of the case is parallel to the optical axis of the photographing lens. The yoke may be adapted to carry the conventional lens turret on one end and the camera motor on the opposite end. In practice, the motor shaft forms the axis of rotation for the case. It is to be understood that the camera case is a complete unit which may be removably mounted in the yoke for rotation and that the case is equipped with a film moving mechanism, a film magazine, a shutter and suitable drive means for the said parts. The case is also provided with a photographing aperture of the conventional order that coincides with the lens aperture in the turret when the camera is in shooting position. In addition, the case is provided with aligned focusing apertures that may be brought into registration with the lens aperture upon rotation of the case in the yoke. To complete the focusing arrangement, I mount an eyepiece on the optical axis of the photographing lens on the yoke opposite the lens turret and form an aperture in the yoke between the lens and the eye piece. With this arrangement, the object to be photographed may be viewed directly through the shooting lens by rotating the case in the yoke and bringing the focusing apertures into registration with the lens aperture in place of the shooting aperture and the film moving mechanism. Focusing is then done directly through the photographing lens.

In the embodiment of my invention illustrated and described, I have designed the case to be rotated approximately 75 degrees. The amount of rotation in this instance is controlled by the internal construction of the camera case and may be greater or less according to the construction used. It is to be understood, however, in rotating the case, the film magazine and the film moving mechanism rotate with it, and as a result there is no movement of the film between the film moving mechanism and the magazine. The case is journalled in the yoke on substantial bearings that provide a means of accurately turning the case on fixed pivots. In addition, the connection of the case with the yoke is relatively near the lens aperture which holds the case so that no inaccuracies can be introduced by the case separating from the lens turret. Furthermore, the bearings of the case being of an internal arrangement are dustproof and may be made to absolute precision thus providing the necessary accuracy in the moving parts of an instrument such a motion picture camera wherein precision is imperative in order to produce good results.

In conjunction with the foregoing, it is another object of this invention to provide a simple efficacious means for determining when the camera is in synchronous relation with a projector when taking process shots. In making process shots, it is known that a projector and camera are used simultaneously; the projector being used to throw a moving background scene on a translucent screen while the camera is used to photograph the scene from the opposite side of the screen. Under this arrangement, the shutters of the camera and the projector must be set to open at the same time. The usual practice is to set the shutters and interlock the motors while the apparatus is at rest. With the arrangement provided by my invention it is not necessary to set the shutters or to interlock the motors, provided synchronous motors are used. The means whereby I do this consists of a synchronizing aperture on the camera spaced 180 degrees from the photographing aperture. This aperture may be provided with a lens if desirable but may be used merely as a peep hole whereby the screen may be viewed through the camera shutter while simultaneously running the camera and the projector. If no light shows on the screen the shutters are in synchronization, since the synchronizing aperture is 180 degrees from the exposure aperture and therefore should show the closure period of the projector.

It is another object of the invention to provide means for synchronizing a camera with a projector while running. For this purpose I provide means for shifting the field of the camera motor. With this arrangement and the synchronizing aperture above mentioned it is possible to bring a camera and a projector into synchronization while running. As explained above, if no light shows on the screen when viewed through the synchronizing aperture, the camera shutter and the projector shutter are opening at the same time and the two machines are in "sync". If light does show on the screen, the camera and projector are out of "sync" and the field of the camera motor may be shifted until the light on the screen disappears. The two machines are then in "sync" and ready for shooting. It can be seen that a check on the "sync" of the machines can be kept while the machines are running and that any tendency to get out of "sync" may be corrected without stopping either machine.

Another object of this invention is to provide a camera having novel means for varying the degree of shutter opening.

Other objects and advantages will appear as the description proceeds in conjunction with the drawings in which.

As previously stated, the principal object of this invention is to provide a means in a motion picture camera for conveniently and accurately focusing the same. For this purpose I have divided the camera, in general, into two parts, namely, the camera case and the yoke. The case carries the film moving mechanism, the shutter, and the film magazine, and the yoke carries the lens turret and the camera motor. The camera case, as will be hereinafter described, is arranged to be rotatably mounted in the yoke.

Figures 1, 2:
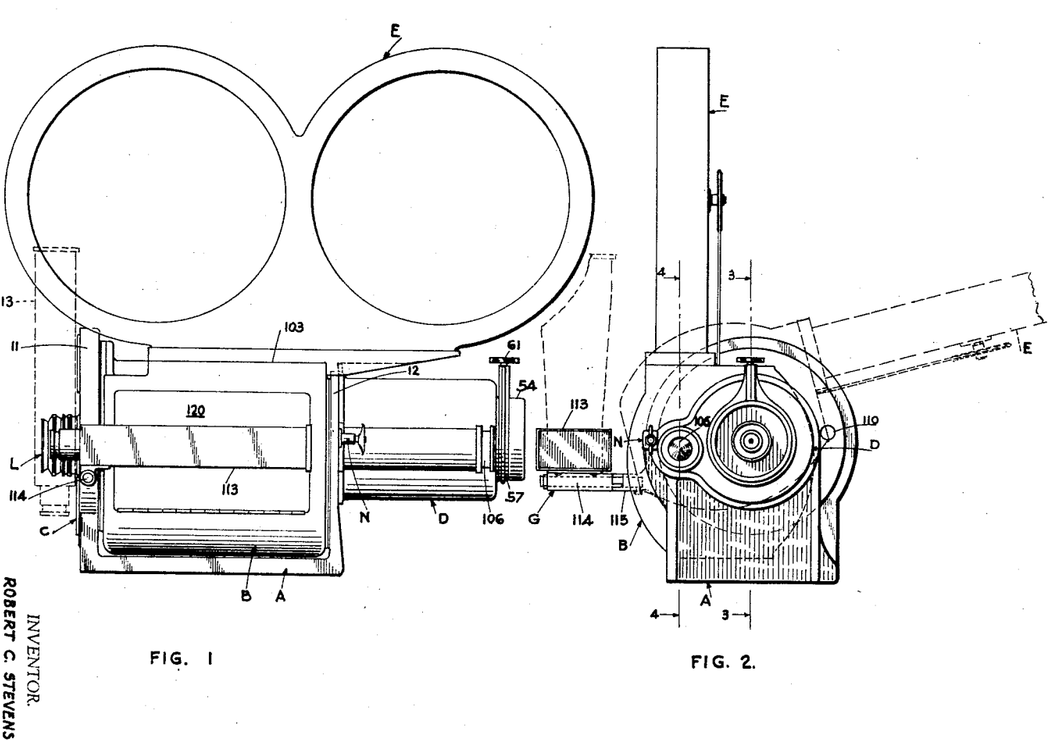
Figure 1 is a side elevation of my camera as it would appear ready for mounting upon any suitable camera support.
Figure 2 is a rear end view of the same.

By referring to Figure 1 the foregoing arrangement of parts may be seen. Here it will be observed that I have designated the yoke A and the camera case B. On one end of the yoke can be seen the conventional lens turret generally designated C, and on the opposite end of the yoke I show the motor housing D. The camera case B carries the film magazine E. The arrangement and correlation of these parts will now be described.

Figures 3, 8:
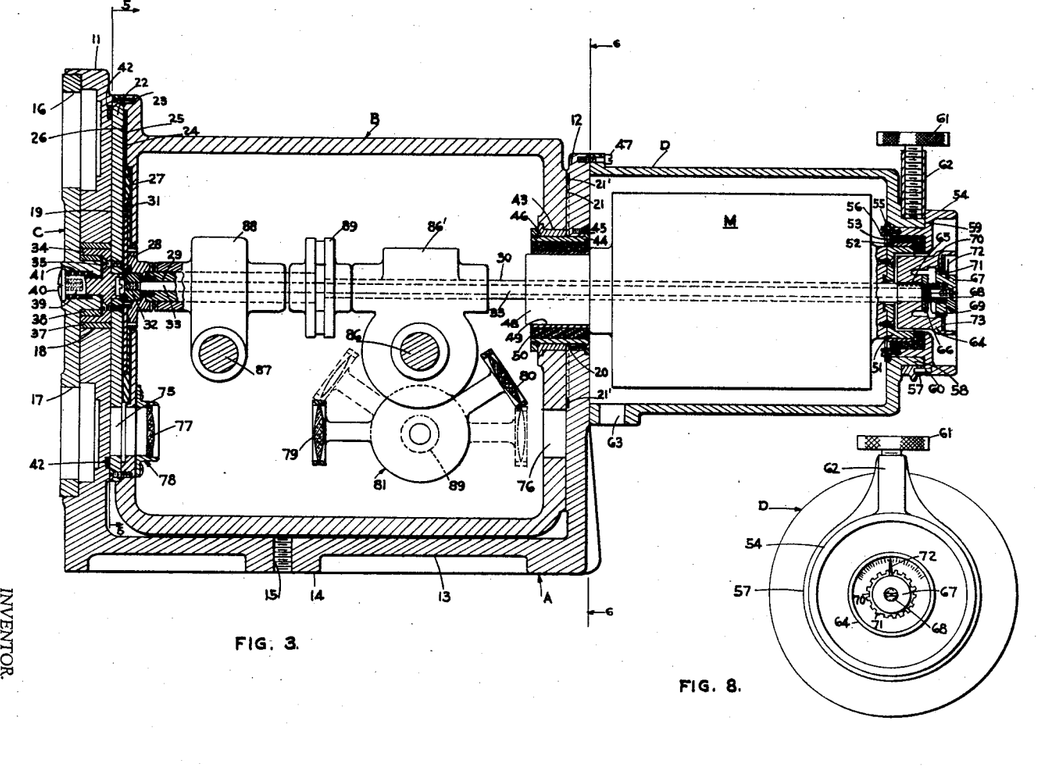
Figure 3 is a longitudinal section taken on line 3—3 of Figure 2.
Figure 8 is a rear end view of Figure 3.
Figures 4, 7:
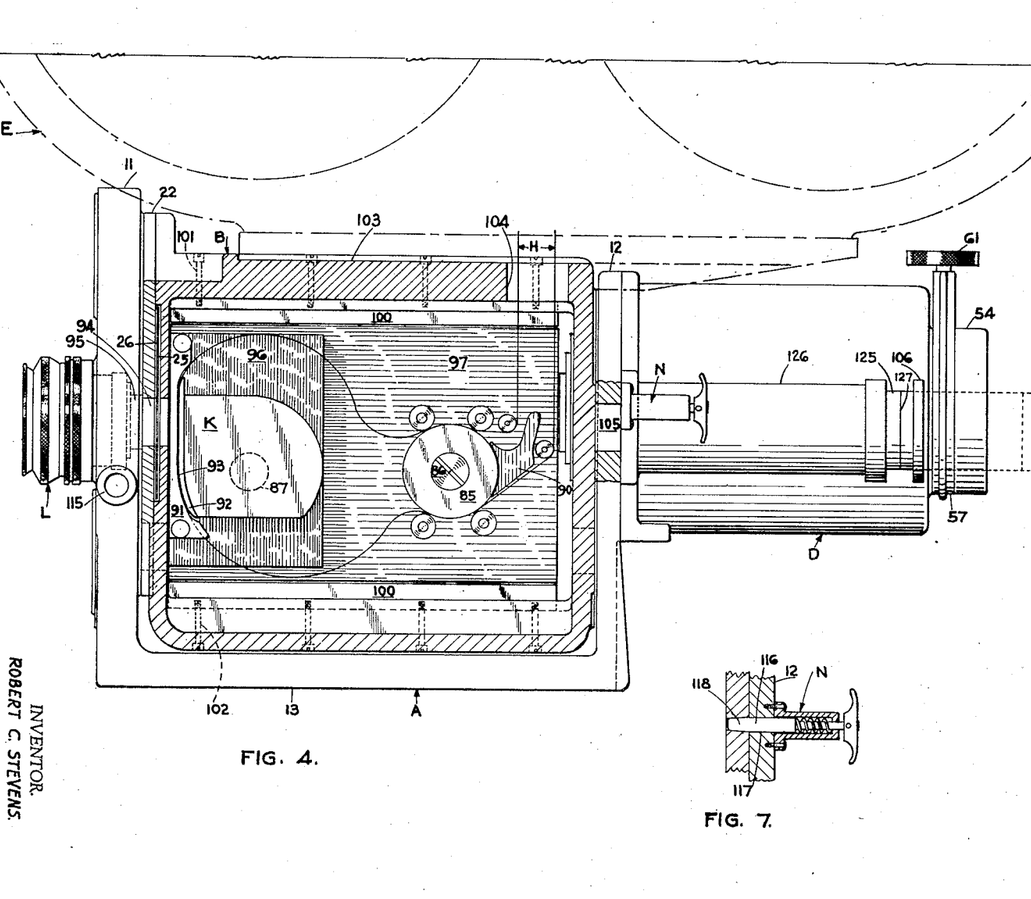
Figure 4 is a longitudinal section taken on line 4—4 of Figure 2.
Figure 7 is a longitudinal section of the detent-arrangement.

In Figure 3 I have shown a longitudinal section taken along the axis of the motor drive shaft showing the manner in which the case is rotatably mounted in the yoke. In this view it will be observed that the yoke A consists of end members 11 and 12 with a cross connecting member 13. The cross connecting member 13 may be equipped with a means for mounting upon any suitable supporting tripod or carriage, and for this purpose I have shown a boss 14 having a screw threaded hole 15 therein. The end member 11 carries the conventional turret generally designated C which is rotatably mounted thereon and held in tight fitting engagement therewith by means to be more fully described in connection with the mounting of the case in the yoke. The lens turret C may be equipped with a plurality of openings such as designated 16 and 17 to receive lens mounts designated L, one of which is shown in Figure 4. The member 11 of the yoke is provided with an opening 18 for rotatably receiving the front end of the case B. On the rear side of the member 11 I form a flat bearing face 19, the purpose of which will be more fully described later. The rear member 12 of the yoke A is formed with an opening 20 into which the rear end of the camera case B is adapted to be rotatably mounted. The forward side of the member 12 carries a substantially flat bearing face 21, while the rear side of the member is formed to receive the motor housing D. The camera case B is adapted to be rotatably mounted in the openings 18 and 20 of the members 11 and 12 respectively. Before entering the description of the mounting of the camera case a description of the construction of the case itself will be given. On the forward end of the case a plate 22 is mounted and held in place by any suitable means such as screws 23. Between the plate 22 and the camera case proper I form a recess 24 which provides working space for the shutter arrangement, which as before stated, is of the variable opening type. Here it can be seen that the shutter arrangement comprises two shutter leaves 25 and 26. The leaf 25 is mounted upon a disc 27 which, in turn, is carried upon a hub 28 that is attached to a shaft 29, said shaft being an extension of the motor drive shaft 30. The leaf 26 is mounted upon a disc 31 which, in turn, is mounted upon a hub 32 that is attached to a shaft 33 telescopically arranged within the shaft 30. The leaves 25 and 26 are arranged to be rotatably moved relative to each other to form a variable shutter opening of the usual order. The means for doing this will be described in conjunction with the description of the means for shifting the motor field. On the plate 22 I also mount a cup shaped member 34 which is attached thereto in any suitable manner such as by screws 35 and utilize this member 34 as a bearing member in the opening 18 of the yoke member 11. In this bearing I may incorporate a wear resisting member 37 between the member 34 and the member 11. The turret C may be mounted internally of the cup shaped member and may have a wear resisting member 38 incorporated therewith. The cup shaped member 34 is formed with a central upstanding stud 39 and a cap screw 40 is mounted in the end of the stud 39 to serve as a means of holding the cup shaped member in the member 11. As a means of providing proper pressure between the forward face of the plate 22 and the rear face 19 of the member 11, I incorporate a spring 41 arranged to engage the under side of the head of the screw 40 and exert a pressure inwardly against the lens turret C. This will be observed through the structure described to exert a pressure tending to pull the camera case B against the face 19 of the turret member 11. The purpose of this arrangement is not only to provide the necessary frictional resistance to prevent easy turning of the case in the yoke, but also to form a light tight seal between the case and the yoke. As an added precaution against light leakage I may incorporate a felt ring 42 in the face 19 of the member 11.

The rear end of the camera case B is rotatably mounted in the rear yoke member 12 in the opening 20 hereinbefore mentioned. In order to provide the utility required in a camera of this nature it is necessary to incorporate means whereby the camera case may be dismounted from the yoke without undue inconvenience.

As a means towards this end I construct the bearing in the opening 20 in the following manner. It will be noted that the camera case B is provided with a hole 43 in the rear wall thereof which hole aligns with the hole 20 in the yoke. A supporting collar 44 is mounted within the hole 20 and held therein by any suitable means such as screws 45, and the hole 43 carries a wear resisting ring 46 adapted to rotatably engage the outer periphery of the collar 44. This will be observed to form a pivotal supporting point in the yoke for the rear end of the camera case B which, according to the structure shown, may be made to precision and provides an accurate point of turning for the case in the yoke. For assembling and disassembling, the collar 44 would be withdrawn from the hole 20, which, after the motor and the shaft had been removed would leave the case free at this end. On the opposite end, the cup shaped member 34 would be removed, after dismounting the turret C, and the case could then be removed from the yoke. The case B when mounted on the bearings just described would form a working fit between the faces 19 and 21 and would be light proof at these points. However, if found desirable a felt ring 21' may be incorporated in the face 21 to further insure against light leakage.

On the rear side of the yoke member 12, as mentioned before, I mount a motor housing D and secure it in place by means of screws 47. Within the motor housing D I mount a camera motor generally designated M in a manner that the stator may be rotated relative to the rotor. For this purpose the entire motor M is supported by bearings on each end. On the forward end I have shown the motor supported within the collar 44. As will be noted here, the motor case is provided with a hub extension 48 which is surrounded by a supporting ring 49 that, in turn, is supported upon an elastic member 50, the member 50, in turn, being supported within the collar 44. On the opposite end of the motor I form a somewhat similar hub extension 51 and support it upon a ring member 52 which member is supported upon an elastic member 53. The elastic member 53 is carried in a collar 54 which is rotatably mounted in the end of the housing D. The collar 54 may be retained in place by means of a ring 55 mounted thereon in any suitable manner such as by screws 56. It is to be understood that the hub 51 through the aforementioned rings is attached to the collar 54 and is adapted to be turned therewith. I provide means for turning the collar 54 which in this instance is illustrated as a ring 57 rotatably mounted over an extension 58 on the housing D and behind a shoulder 59 on the collar 54. The collar 54 and the ring 57 may be suitably connected by a pin 60 which adapts the collar 54 to be turned by means of the ring 57. Suitable lock means for holding the ring 57 in the required position is provided and may take a variety of forms. In this instance I have shown a set screw 61 screw threadedly mounted in a boss 62 on the ring 57. The set screw 61 not only serves as a means of locking the ring in place but also a means of turning the ring 57. From the foregoing construction it will be seen that the stator of the motor M may be rotated in its bearing support. This, as is well known, rotates the field of the motor and serves as a means of changing the synchronous relation of interlocked motors and may be used to synchronize shutters in a process shot. The housing D may be provided with an opening 63 for admitting electrical conductors to the motor and the annular space between the housing D and the motor M may serve as storage space for the extra length of the conductors necessary for the rotation of the motor case in its end bearings. The shaft 30 previously mentioned is fixed to the rotor of the motor and extends through and beyond the rear end of the motor housing. The telescoping shaft 33 which also has been previously mentioned in connection with the shutter leaves extends through the shaft 30 and the two ends of the shaft are adjustably connected in the following manner. On the outer end of the shaft 30 I mount a member 64, said member being secured to the shaft by means of a key 65 and held thereon by a screw threaded member 66. On the outer end of the shaft 33 I slidably mount a member 67 which is adapted to rotate therewith by virtue of the end of the shaft being squared and is held thereon by a screw 68 in the end of the shaft. Between the members 64 and 67 I interpose a compression spring 69 which tends to force the member 67 outwardly with respect to the member 64. The members 64 and 67 are interlocked in the following way. The member 64 is equipped with inwardly extending gear teeth 70 and the member 67 has outwardly extending gear teeth 71 adapted to engage the teeth 70. These teeth are adapted to mesh for the width of the teeth 70 only. Accordingly when the member 67 is pushed inwardly toward the member 64 the teeth 70 and 71 will go out of mesh and the shaft 33 may be rotated relative to the shaft 30 to any desired extent, whereupon the two shafts may be again interconnected by allowing the member 67 to travel outwardly under the urge of the spring 69. A pointer 72 may be provided on the member 67 which would indicate against a dial 73 the exact amount of relative turning of the two shafts.

The above described construction is for the purpose of changing the amount of shutter opening. From the foregoing it will be seen that the shaft 33 may be rotated relative to the shaft 30 which changes the relation between the leaves 25 and 26. The leaves 25 and 26 are of the customary arrangement wherein one leaf over laps the other and may, therefore, be moved relative to the other to decrease the size of the opening in the shutter.

The preceding description deals mainly with a structure for mounting a camera case whereby it may be rotated about an axis. As mentioned in the forepart of this specification, it is a purpose of this invention to provide a means for focusing motion picture cameras and this particular type of mounting is a means toward this end. In conjunction with the foregoing structure, I provide means for viewing directly through the camera case and the photographing lens. It will be observed that the camera case is provided with an aperture 75 in the front wall and an aperture 76 in the rear wall. These apertures are optically aligned and it will be noted that the aperture 75 is closed by the member 11 of the yoke and the aperture 76 is closed by the member 12 of the yoke. This is the position of the apertures when the case is in shooting position. The focusing position will be described later. As is well known, it is necessary to provide an image receiving plane in a focusing arrangement, and for this purpose I mount a ground glass 77 behind the aperture 75 in any suitable manner such as by a mount generally designated 78. In order to provide a magnified image when focusing for a close-up, I mount a pair of lenses 79 and 80 upon a turn table arrangement generally designated 81. Each of these lenses may serve as an objective between the image receiving plane and the eye piece, and are so arranged that when the lens 79 is on the optical axis of the focusing arrangement, the lens 80 is clear of the line of sight, and in the reverse order when the lens 80 is on the optical axis the lens 79 is clear. The means whereby I do this may be more clearly seen in Figure 5. Here it will be observed that the turn table generally designated 81 is rotatably mounted upon a flange member 82, which in turn is carried upon the camera case B. A shaft 83 having a manually accessible head 83' extends through the case and the flange 82 to the turntable 81 and is suitably attached thereto. By turning the head 83' the lenses 79 and 80 may be brought into and out of registration with the line of sight of the focusing arrangement and will thus yield either a frame view or a magnified view of the field.

Figures 5, 6, 9:
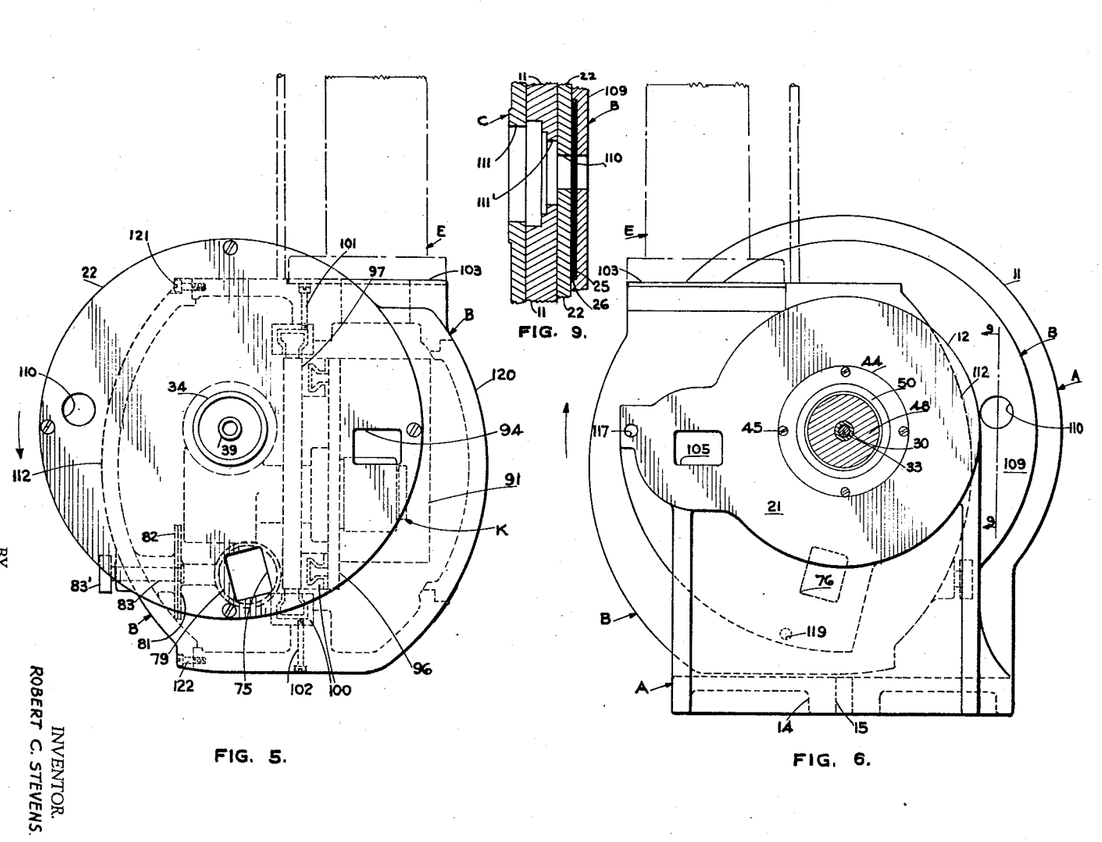
Figure 5 is a transverse section taken on line 5—5 of Figure 3.
Figure 6 is a transverse section taken on line 6—6 of Figure 3.
Figure 9 is a fragmentary view taken on line 9—9 of Figure 6.

The camera case B also contains an intermittent movement generally designated K together with a film feeding sprocket 85. The roller 85 is arranged to be driven by a shaft 86 connected to the shaft 30 by means of a gear transmission box 86'. The intermittent movement K is arranged to be driven by a shaft 87 connected to the shaft 30 by means of a gear transmission box 88. Between the transmission box 86' and 88 I may incorporate a flexible coupling unit 89. In connection with the feed sprocket 85 I may use conventional keeper rollers as illustrated and a stripping device 90. The intermittent mechanism K is equipped with a front plate 91 and a back plate 92 with a film chute 93 between the two plates in the usual manner. The camera case B, as shown in this view, is provided with a photographing aperture 94 which aligns with a photographing aperture 95 in the member 11 of the yoke A. The intermittent mechanism is suitably mounted upon a plate 96 which, in turn, is mounted upon a plate 97. Referring to Figure 5, it can be seen that the plate 97 is supported within the camera case B. Between the plate 96 and the plate 97 and also between the plate 97 and the case B I incorporate elastic mounting members generally designated 100. By means of such a mounting the film feeding mechanism is resiliently supported in the case and I am enabled to remove the essential part of the camera structure by removing screw members 101 and 102 of which there may be a sufficient number to satisfactorily mount the plate 97 in the case B. Means is provided for mounting the hereinbefore mentioned film magazine E fragmentarily indicated in dotted lines and as shown comprises a flat surface 103 upon the upper part of the case B. The details of the magazine mounting are omitted for the sake of simplicity. An opening 104 is provided in the case B to permit the film H to be fed into the case from the magazine in the usual manner. With the structure described the camera case B may be rotated in the yoke A upon an axis which coincides with the axis of the shaft 30 of the motor M. By rotating the case B, the apertures 75 and 76 are rotated into registration with the aperture 95 of the member 11, and the photographing aperture 94 of the case is replaced by the aligned focusing apertures. The yoke member 12 is provided with an aperture 105 optically aligned with the photographing aperture 94 and an eye piece 106 is adjustably mounted on the optical axis of this lens system. With the apertures 95, 75, 76 and 105 aligned together with the eye piece 106 optically aligned with said apertures viewing may be had directly through the photographing lens. Focusing may then be done directly on the object to be photographed.

This invention also provides means for synchronizing a camera and a projector when used conjointly in process shots. In making process shots the usual practice is to project a moving background scene upon a translucent screen by means of a projector and, at the same time, to photograph the moving background in conjunction with action in front of the screen by means of a motion picture camera substantially aligned with the projector and synchronized with the same. By synchronization, it is meant that the shutters of the camera and the projector open and close simultaneously. This relation must be maintained throughout the entire scene and should be allowed to vary only within a very small limit. In order to obtain this relation it is customary to set the shutters of the two machines while at rest and electrically interlock the motors. However, after the machines are started there is no way of checking whether the machines remain in synchronization. Furthermore, it would be desirable to do away with all necessity of setting the shutters and of interlocking the motors and to allow synchronous motors to run independently. In my invention I provide means for this purpose in the following manner. Referring to Figures 5, 6 and 9 it will be seen that I have formed an aperture 110 extending through the front wall 109 of the camera case B and the plate 22. This aperture will be noted to be outside the wall 112 of the case B so that a view may be had through the aperture exteriorly of the case. The aperture 110 is placed diametrically opposite the photographing aperture 94 of the case and is substantially of the same radius as the aperture 94. This will be appreciated as placing the aperture 110 inside the shutter radius and consequently will permit a view directly through the shutter area. The aperture 110 being diametrically opposite the aperture 94 will fall under a lens mount recess 111 in the lens turret and an aperture 111' in the yoke directly behind the position of the lens will provide a view directly through the shutter onto the screen. Bearing in mind that the aperture 110 is 180 degrees of rotation of the shutter away from the aperture 94, it will be understood that when the projector and camera are running in synchronization, the light must be at a minimum when viewed through the aperture 110 since this aperture shows the closure period of the projector and the screen should therefore be dark. I may provide an eye piece, not shown, for convenience in viewing through this arrangement if found desirable.

The camera is provided with the customary outside finder arrangement generally designated G. This device may take a variety of forms but I have shown it in this case comprising a tube 113 equipped with suitable lenses, said tube being rotatably mounted upon a shaft 114 which, in turn, is mounted upon the yoke in a hub 115. The tube 113 is arranged to be tipped up on the shaft 114 as an axis and when in this position assumes the dotted line position shown in Figures 1 and 2. When in this position the case B may be rotated in the yoke for focusing.

The invention also includes means for locking the case B against rotation in the yoke A. In Figures 4 and 7 I have shown a detent key arrangement generally designated N, which is arranged to hold the camera case B in a fixed shooting position and also in a fixed focusing position. This key must be operated before the case can be turned upon its axis. In Figure 7 I have shown the details of this detent arrangement. Here it will be seen that a spring pressed plunger 116 is mounted upon the member 12 of the yoke A and extends through a hole 117 in said member. The inner end of the pin is arranged to engage holes 118 and 119 in the rear wall of the case B. When the pin is in the hole 118 the case would be in a shooting position and when in hole 119, in a focusing position. It, therefore, becomes apparent that by withdrawing the detent pin, the case may be rotated in the yoke and will assume either the full line position or the position shown in dotted lines in Figure 2. In the full line position, the case is in position for shooting. In the dotted line position, focusing may be done directly through the photographing lens by means of the eye piece 106 and, as explained before, either a frame image or an enlarged image may be had by working the lenses 79 and 80.

The case B may be formed with a door 120 suitably and conveniently mounted on one side of the case for access to the film moving mechanism for threading and cueing the film and on the opposite side I may arrange the wall 112 of the case to be detachably mounted by means of screws 121 and 122. The foregoing described structure provides a workmanlike, durable, precise arrangement of parts for the purpose described.

In order to provide the utmost utility, I have arranged the eye piece 106 to be moved into an out-of-the-way position when not in use. For this purpose, I have mounted the eye piece 106 upon a sleeve 125 and have arranged the sleeve 125 to be telescopically mounted in a supporting member 126, which may be a part of the motor housing D. When not in use, the eye piece 106 would take the full line position shown in Figure 4 and when in use would be drawn out to the dotted line position. Suitable stops (not shown) may be provided for holding the sleeve 125 in each of the positions shown. The eye piece 106 may be turnably mounted in the sleeve 125 for focusing purposes and as illustrated would be arranged to turn on the line 127 relative to the sleeve 125.

I claim:

1. A motion picture camera comprising: a yoke having a photographing aperture in the front end thereof and an optically aligned focusing aperture in the opposite end; a camera case having a photographing aperture and a focusing aperture spacedly disposed in the front end thereof and a focusing aperture in the opposite end optically aligned with the focusing aperture in the front end of the camera, and means for rotatably mounting said case in said yoke so that the case may be rotated to selectively register the photographing aperture or the focusing aperture in the camera case with the photographing aperture in the yoke.

2. In a motion picture camera: a yoke adapted to be mounted upon a camera support and a camera case rotatably mounted in said yoke, said yoke having a photographing aperture and said camera case having a photographing aperture and a focusing aperture adapted to be selectively registered with the photographing aperture in said yoke by rotation of the case in the yoke.

3. In a motion picture camera: a yoke having a photographing aperture therein; a camera case rotatably mounted in said yoke said case having a photographing aperture in one end thereof adapted to be registered with said first mentioned aperture upon rotation of said case in said yoke, and a camera motor having a drive shaft coinciding with the axis of rotation of said case.

4. In a motion picture camera: a yoke having a photographing aperture therein; a camera case rotatably mounted in the yoke said case having a photographing aperture in one end thereof adapted to be registered with said first mentioned aperture upon rotation of said case in said yoke; a camera motor mounted on said yoke and a camera drive shaft adapted to be driven by said motor coinciding with the axis of rotation of the case.

5. In a motion picture camera: a yoke having a photographing aperture therein; a camera case rotatably mounted in said yoke said case having a photographing aperture in one end thereof adapted to be registered with said first mentioned aperture upon rotation of said case in said yoke; a film moving mechanism within said case; means for driving said film moving mechanism said means including a drive shaft coinciding with the axis of rotation of said case.

6. In a motion picture camera: a yoke having a photographing aperture therein; a camera case rotatably mounted in the yoke said case having a photographing aperture in one end thereof adapted to be registered with said first mentioned aperture upon rotation of said case in said yoke; a film moving mechanism within said case; a shutter operably arranged on said case; means for driving said film moving mechanism and said shutter, said means including a drive shaft coinciding with the axis of rotation of said case.

7. In a motion picture camera: a yoke having a photographing aperture therein; a camera case having a photographing aperture in one end thereof adapted to be registered with said first mentioned aperture upon rotation of said case in said yoke; a film moving mechanism within said case; a shutter operably arranged on said case; a film magazine mounted on said case; means for rotatably mounting said case in said yoke; means for driving said film moving mechanism and said shutter, said last means including a drive shaft coinciding with the axis of rotation of said case.

8. In a motion picture camera: a yoke having a photographing aperture therein; a photographing lens mounted over said aperture; and a camera case rotatably mounted in said yoke and arranged to rotate about an axis spaced from and parallel to the optical axis of said lens.

9. In a motion picture camera: a yoke adapted to be mounted upon a supporting means, said yoke having spaced, upright members, one of said members having a lens turret thereon, and the other of said members having a camera motor mounted thereon; and a camera case rotatably supported between said members and adapted to be driven by said motor.

10. In a motion picture camera: a yoke adapted to be mounted upon a supporting means, said yoke having a pair of spaced, upright members; a lens turret mounted upon one of said members; a camera motor mounted on the other of said members, said camera motor having a shaft extending between said members adapted to drive said camera; and a camera case rotatably supported by said members and adapted to rotate about said shaft as an axis.

11. In a motion picture camera: a yoke having spaced upright members, one of said members having a photographing aperture therein and the other of said members having a focusing aperture optically aligned with said photographing aperture; an eye piece arranged to view through said focusing aperture; a camera case rotatably supported between said upright members, said camera case having a photographing aperture and optically aligned focusing apertures adapted to be selectively registered with the photographing aperture in the yoke member upon rotation of the case in the yoke.

12. In a motion picture camera: a yoke having spaced, upright members, one of said members having a photographing aperture therein and the other of said members having a focusing aperture optically aligned with said photographing aperture; an eye piece arranged to view through said focusing aperture, said eye piece being telescopically mounted for disposition into an out-of-the-way position when not in use; a camera case rotatably supported between said upright members, said camera case having a photographing aperture therein and optically aligned focusing apertures adapted to be selectively registered with the photographing aperture in the yoke member upon rotation of the case in the yoke.

13. In a motion picture camera: a yoke having spaced, upright members one of said members having a photographing aperture therein, and the other of said members having a focusing aperture optically aligned with said photographing aperture; an eye piece mounted in a sleeve and arranged to view through said focusing aperture; and means for slidably mounting said sleeve upon the yoke so that the eye piece may be moved into an out-of-the-way position when not in use.

14. The elements of claim 11 and in addition thereto, means within said camera case for throwing a normal image or an enlarged image upon said eye piece, said means including a pair of spacedly disposed lenses and means for optionally and alternately positioning each of said lenses between the optically aligned focusing apertures in the camera case.

15. In a motion picture camera having a fixed photographing aperture: a camera case having a photographing aperture therein, and aligned focusing apertures for viewing through the case and means for rotatably mounting the case so that said photographing aperture or said viewing apertures may be selectively registered with said fixed photographing aperture.

16. In a motion picture camera: a yoke adapted to be mounted upon a supporting means, said yoke having a pair of spaced upright members, one of said members having a photographing aperture therein; a camera case rotatably mounted in said members and supported therebetween, said camera case having a photographing aperture and a focusing aperture therein adapted to be selectively registered with the photographing aperture in the yoke by rotation of the camera case in the yoke, and a detent arrangement for holding the camera case fixed in a photographing position or a focusing position.

17. In a motion picture camera: a yoke having a camera case rotatably mounted therein, said yoke having a photographing aperture in one end thereof and said case having a photographing aperture eccentrically of the axis of rotation of said case adapted to be registered with said photographing aperture in the yoke upon rotation of the case upon its axis.

18. In a motion picture camera: a yoke having spaced upright members adapted to be mounted upon a supporting member, one of said yoke members having a photographing aperture therein, and the other of said yoke members having a viewing aperture optically aligned with said photographing aperture; a camera case rotatably supported in said yoke members, one end of said camera case having a photographing aperture and a viewing aperture circumferentially disposed about the axis of rotation of said camera case adapted to be selectively registered with said photographing aperture in the yoke upon rotation of said case and the opposite end of said case having a viewing aperture optically aligned with said viewing aperture in the opposite end of said case.

19. The elements of claim 18 and in addition thereto a motor mounted upon the other of said yoke members, and adapted to drive said camera.

20. The elements of claim 18 and in addition thereto an eye-piece mounted over the viewing aperture in the said yoke member.

21. The elements of claim 18 and in addition thereto a motor mounted upon the other of said yoke members, adapted to drive said camera and an eye-piece mounted over the viewing aperture in the said yoke member.

22. For use in a motion picture camera: a camera case adapted to be rotatably supported on opposite ends, one of said ends having a pair of spaced apertures equi-distant from the axis of rotation of said case and the other end having a single aperture which is optically aligned with one of said first mentioned apertures, said optical alignment being parallel to the axis of rotation of said case.

23. For use in a motion picture camera: a camera case having a film-moving mechanism, a drive shaft in said case for driving said film-moving mechanism, means for mounting said case so that it will rotate about said shaft as an axis of rotation, said case having a pair of spaced apertures in one end thereof equi-distant from said axis of rotation and a single aperture in the opposite end which has an optical alignment with one of said first mentioned apertures that is parallel to the axis of rotation of said case.

24. In a motion picture camera: a yoke having spaced upright members, one of said members having a photographic aperture therein and the other of said members having a focusing aperture optically aligned with said photographic aperture; a camera case having a film-moving mechanism therein and a drive-shaft in said case for driving said film-moving mechanism, mounted in said yoke so that it will rotate about said drive-shaft as an axis of rotation, said case having a pair of spaced apertures in one end thereof equi-distant from said axis of rotation, adapted to be selectably registered with said photographing aperture in the yoke upon rotation of the case, and a single aperture in the opposite end of said case which has an optical alignment with one of the first mentioned apertures that is parallel to the axis of rotation of said case, adapted to be simultaneously registered with the focusing aperture in the yoke member upon registration of its optically aligned aperture with the photographing aperture in the opposite end of the yoke.

25. In a motion picture camera: a yoke, a camera case adapted to be rotatably supported on opposite ends in said yoke, one of said ends having a pair of spaced apertures equi-distant from the axis of rotation of said case, the other end having a single aperture which has an optical alignment with one of said first-mentioned apertures that is parallel to the axis of rotation of said case.

26. In a motion picture camera: a yoke having spaced upright members, a photographing aperture having an objective mounted thereover in one of said members and a focusing aperture having an eye-piece thereover in the other of said members, a camera case having a film-moving mechanism and a drive-shaft in said case for driving said film-moving mechanism, rotatably mounted in said yoke so that it will rotate about said shaft as an axis of rotation, said case having a pair of spaced apertures in one end thereof equi-distant from said axis of rotation, adapted to be selectively registered with said photographing aperture in the yoke upon rotation of the case and a single aperture in the opposite end which has an optical alignment with one of the first-mentioned apertures that is parallel to the axis of rotation of said case and a motor mounted upon one of the yoke members and arranged to drive said drive-shaft.

ROBERT COLBY STEVENS.